May 19, 1925.
A. O. HOLTOM
1,538,485
CONVERTIBLE VEHICLE BODY
Original Filed Dec. 31, 1921　　4 Sheets-Sheet 1
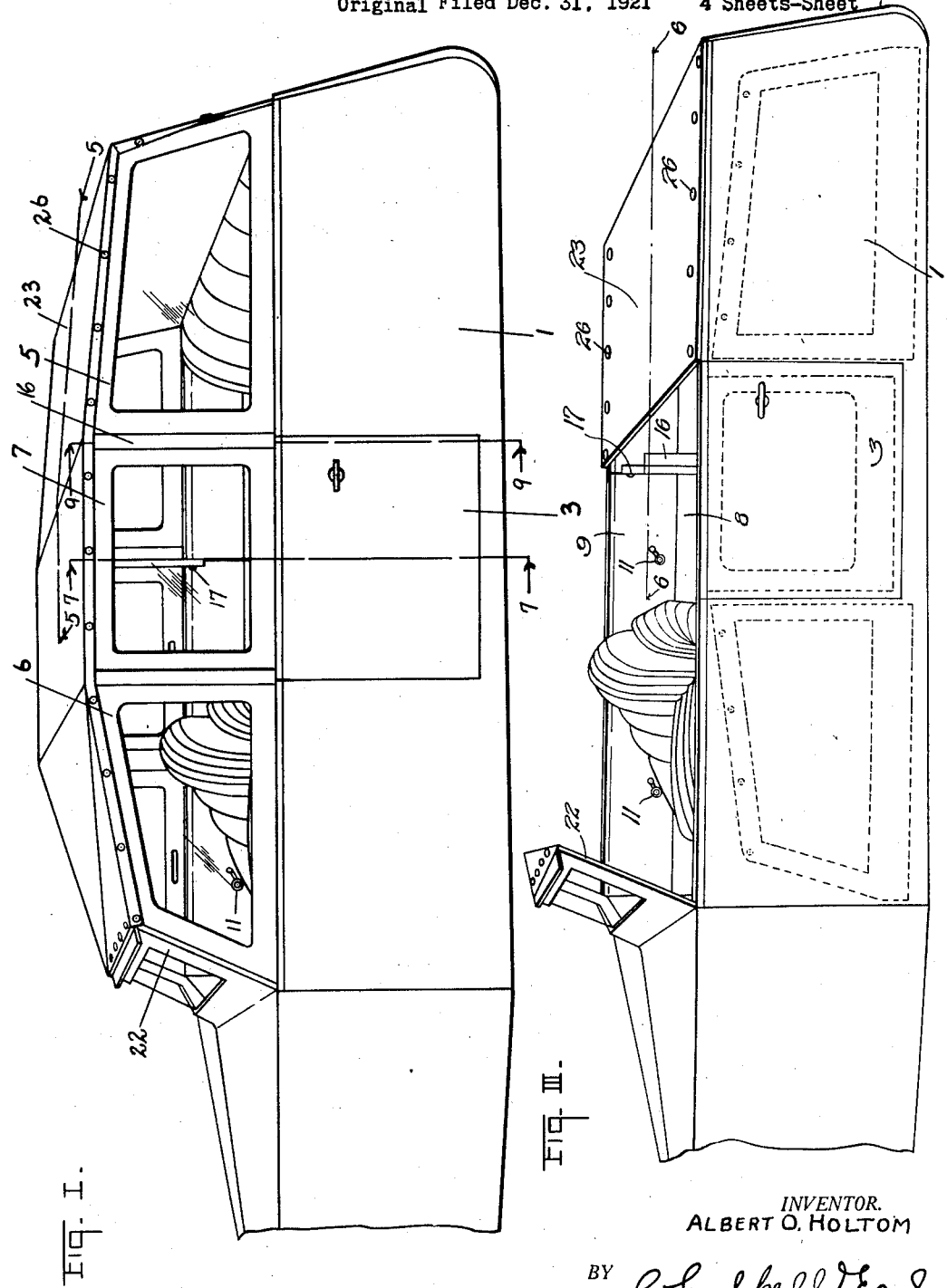
INVENTOR.
ALBERT O. HOLTOM
BY Chappell Earl
ATTORNEYS.

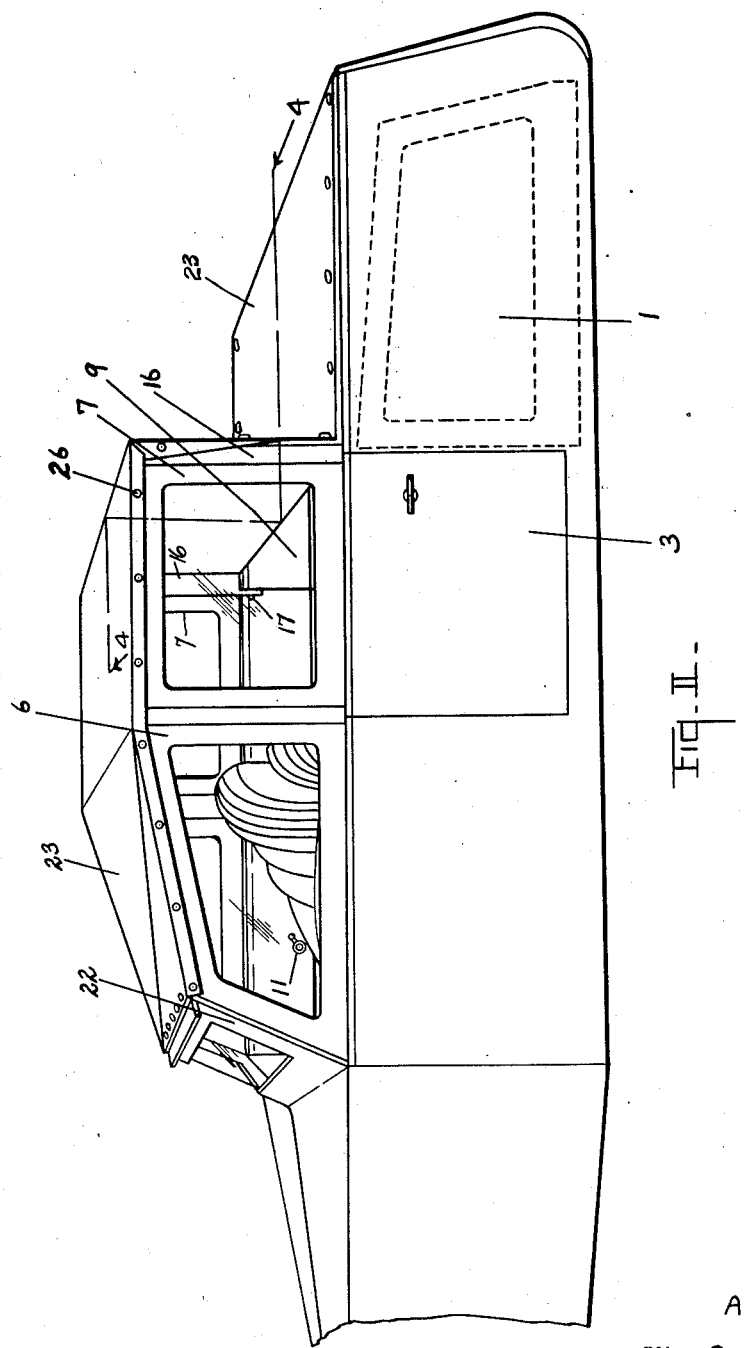

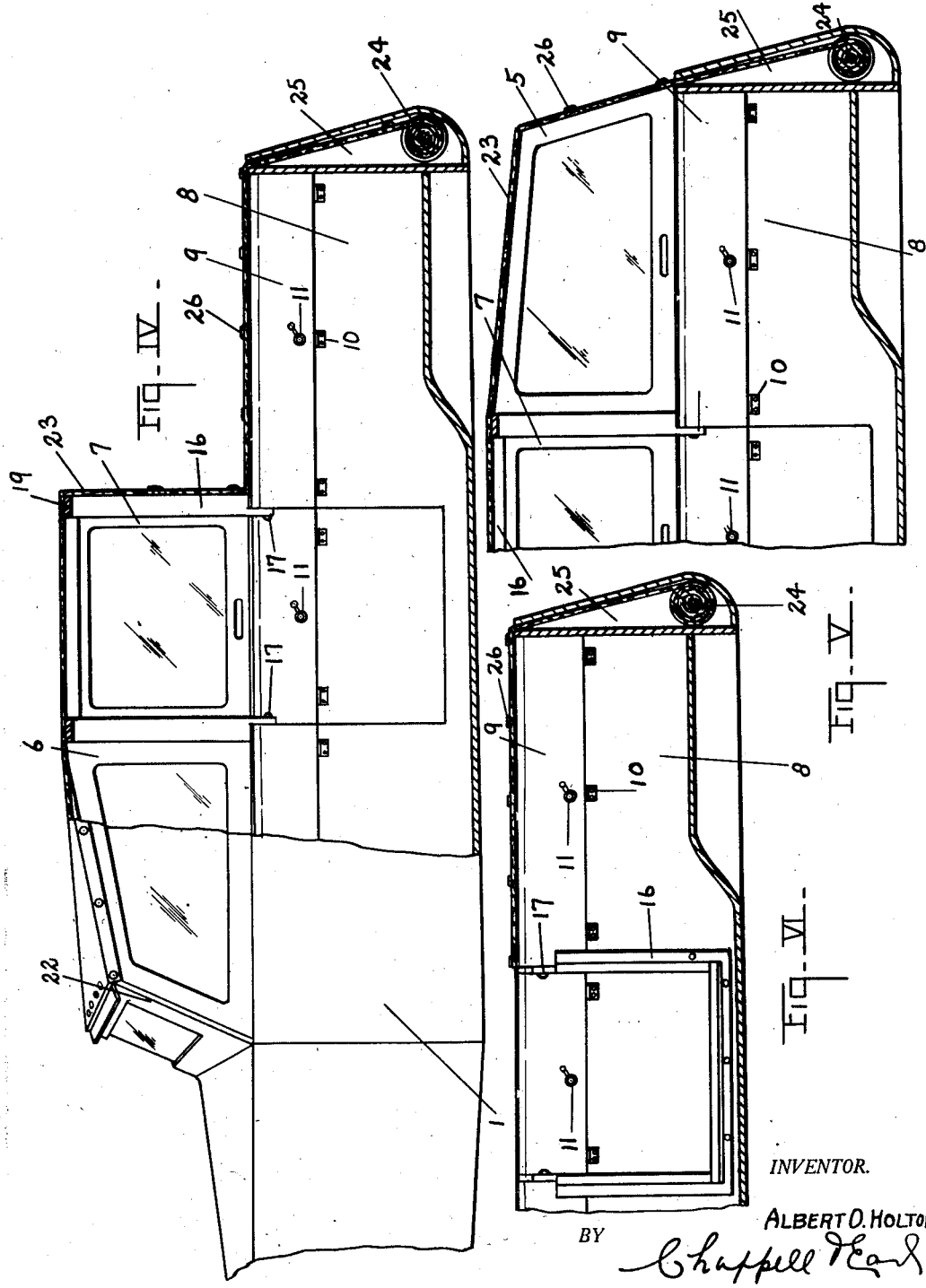

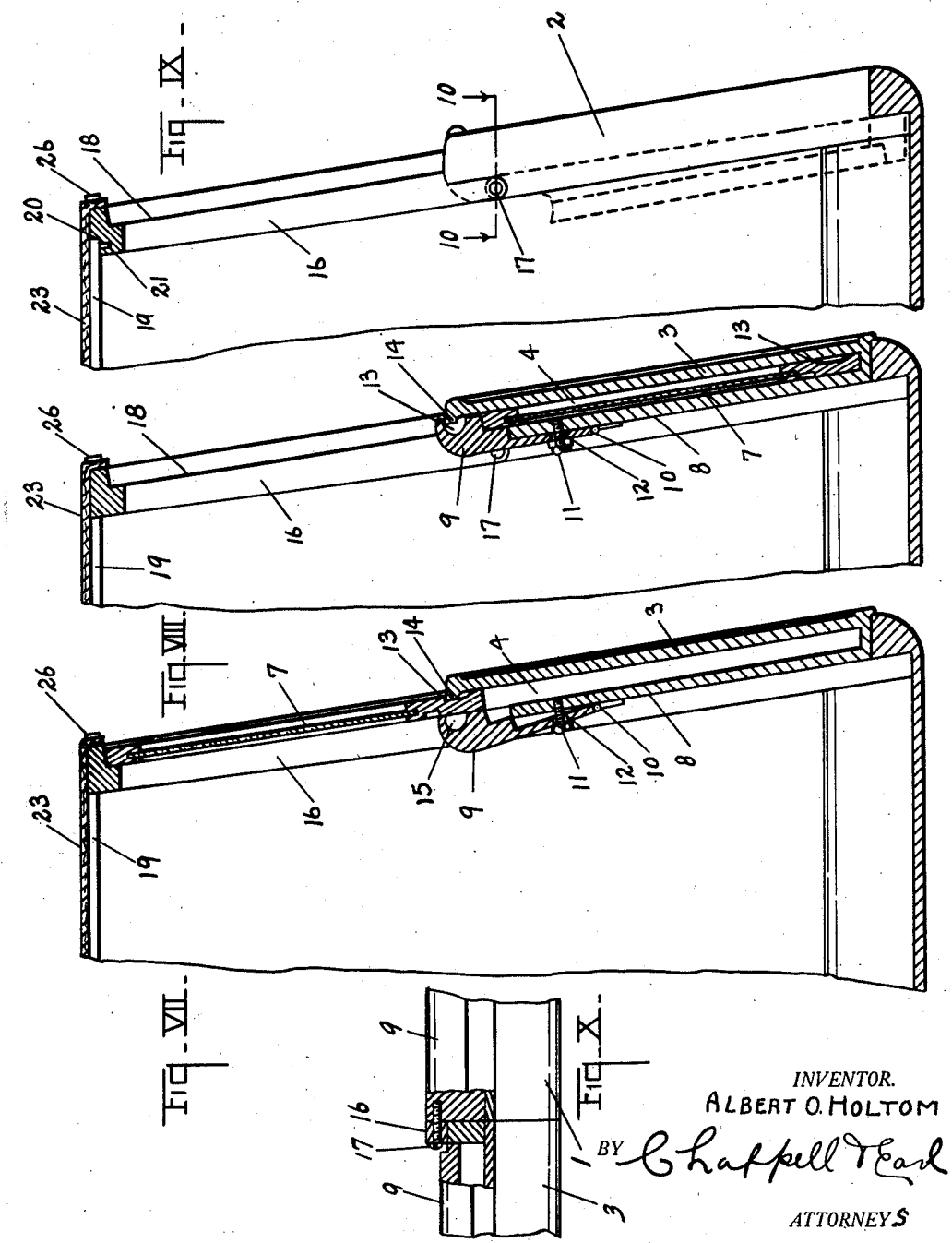

Patented May 19, 1925.

1,538,485

UNITED STATES PATENT OFFICE.

ALBERT OWEN HOLTOM, OF NEW YORK, N. Y.

CONVERTIBLE VEHICLE BODY.

Application filed December 31, 1921, Serial No. 526,277. Renewed January 12, 1925.

*To all whom it may concern:*

Be it known that I, ALBERT O. HOLTOM, a citizen of the United States, residing at city of New York, State of New York, have invented certain new and useful Improvements in Convertible Vehicle Bodies, of which the following is a specification.

This invention relates to improvements in convertible vehicle bodies.

The main objects of this invention are:

First, to provide an improved convertible vehicle body which may be adjusted as an open vehicle, either touring or runabout type, to a sedan type or to a coupé type.

Second, to provide an improved convertible vehicle body having these advantages which is neat and attractive in appearance when adjusted to any of its several forms.

Third, to provide an improved convertible vehicle body which is very quickly and easily converted from one form to another.

Fourth, to provide an improved convertible vehicle body which is very economical in structure.

Further objects, and objects relating to structural details, will definitely appear from the detailed description to follow.

I accomplish the objects of the invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a detail side perspective view of my improved convertible vehicle body adjusted as a sedan or closed body.

Fig. II is a detail side perspective view of my improved convertible vehicle body adjusted as a coupé.

Fig. III is a detail side perspective view of my improved convertible vehicle body adjusted as an open vehicle, the tonneau of the body being partially enclosed or covered.

Fig. IV is a detail perspective view partially in longitudinal section on a line corresponding to line 4—4 of Fig. II.

Fig. V is a detail vertical section corresponding to that of Fig. IV on a line corresponding to line 5—5 of Fig. I.

Fig. VI is a detail vertical longitudinal section on a line corresponding to line 6—6 of Fig. III.

Fig. VII is a detail transverse section on a line corresponding to line 7—7 of Fig. I, showing structural details.

Fig. VIII is a detail vertical section corresponding to that of Fig. VII with the door panel telescoped.

Fig. IX is a detail vertical section on a line corresponding to line 9—9 of Fig. I.

Fig. X is a detail horizontal section on a line corresponding to line 10—10 of Fig. IX, showing details of the support for the collapsible top member.

In the drawing similar reference characters refer to similar parts throughout the several views, and the sectional views are taken looking in the direction of the little arrows at the ends of the section lines.

Referring to the drawings, my improved vehicle body, in the embodiments illustrated, comprises sides 1 having door openings 2 therein, the structure illustrated being a two door structure, the door openings being opposite. The doors 3 and the sides are provided with chambers 4 for the side and door panels, designated generally by the numerals 5, 6 and 7, the panels 5 being the rear side panels, the panels 6 the front side panels and the panels 7 the door panels. The inner walls 8 of the doors and sides terminate below the outer walls. The top rails 9 are hinged to the inner ends of the side walls, as at 10, and are adapted to close against the inner side of the outer walls, as shown in Fig. VIII, clamping nuts 11 mounted on the threaded studs 12 being provided for clamping the rails in their closed position. When the panels are erected these rails constitute clamping members for holding the panels in their erected position. To securely engage the panels they are provided with grooves 13 on their outer sides with which the inwardly projecting ribs 14 of the outer walls engage, the rails 9 clamping the inner sides of the panels, as shown in Fig. VII, thereby securely supporting the same. When the panels are telescoped the rails, as stated, close against the outer side walls and they are provided with grooves 15 adapted to receive the ribs 14, thereby providing a closed joint for the tops of the panel chambers and also a finish.

The frame-like top members 16 are hinged at 17 to the sides so as to collapse downwardly around the door opening, as shown in Fig. IX by dotted lines, or to be swung to erected position, as shown by full lines in Figs. VII, VIII and IX. When erected the top members 16 constitute door frame extensions and are rabbeted to provide jambs 18 for the erected door panels. The top members 16 are held in their erected position by the top cross pieces 19, the ends of which fit in recesses 20 provided therefor in the top frames, see Fig. IX, the cross pieces also being provided with dowels 21, as shown in this figure.

The wind shield, designated generally by the numeral 22, is, in the structure illustrated, of the A type. The cover 23 is of flexible material, a roller 24 arranged in a housing 25 at the rear of the body being provided for storing the cover. This cover is provided with a plurality of fastener members 26, those illustrated being of the snap fastener type, while the side panels, top frame members, the wind shield and the rear portion of the body side walls are provided with coacting fastener members so that the top may be secured with the panels adjusted in various relations, for instance, as in Fig. I. All of the panels are erected and the top is drawn over and secured to the side panels, the wind shield and the top frame member. The coupé type of vehicle is produced by telescoping the rear side panels, and the cover is then secured along the upper edge of the side walls at the rear of the doors to the top frame members, to the front side panels 7 and to the wind shield.

When the vehicle is adjusted to provide a runabout type the panels are all telescoped as are also the top frame members, and the cover is secured only to the sides at the rear of the doors. The cover may be quickly disengaged from the sides and an open touring body would then be secured.

My improved convertible body is very simple and economical in structure. The panels and frames when erected are securely held without rattling and may be very quickly adjusted from one type of body to another.

My improved body is very light in weight and it is adapted for adjustment to meet conditions usually met by the raising and lowering of a touring car type of top.

I have shown various parts in more or less conventional relation, as the structural details thereof are not part of this invention.

Having thus described my invention, what I claim as new and desire to secure by Letters Patent, is:

1. In a convertible vehicle body, the combination of sides having opposed door openings therein, doors, said sides and doors being chambered to receive side and door panels, the inner walls of said sides and doors terminating below the outer, front and rear side and door panels telescoping in said sides and doors, top rails hinged to the inner walls of the sides and doors to complement the same and adapted to close outwardly against the outer walls or to clamp the panels when in their erected position, clamping means for said rails whereby the panels are independently supported, frame-like top members hinged to the sides to collapse inwardly about the said door openings thereof or to be swung to erected position constituting door frame members for the erected door panels, detachable cross top members supporting said top members in erected position, a wind shield, and a cover of flexible material adapted to be drawn over said panels and said top frame members, said side panels and top frame members and wind shield, and said cover being provided with coacting disengageable fastener members whereby the cover may be detachably secured thereto, said sides being also provided with fastener members adapted to coact with the fastener members of said cover when the rear side panels are collapsible, for the purpose specified.

2. In a convertible vehicle body, the combination of sides having door openings therein, doors, said sides and doors being chambered to receive side and door panels, the inner walls of said sides and doors terminating below the outer, front and rear side and door panels telescoping in said sides and doors, top rails hinged to the inner walls of the sides and doors to complement the same and adapted to close outwardly against the outer walls or to clamp the panels when in their erected position, clamping means for said rails whereby the panels are independently supported, frame-like top members hinged to the sides to collapse inwardly about the said door openings thereof or to be swung to erected position constituting door frame members for the erected door panels, and a cover of flexible material adapted to be drawn over said panels and said top frame members, said side panels and top frame members, and said cover being provided with coacting disengageable fastener members whereby the cover may be detachably secured thereto, said sides being also provided with fastener members adapted to coact with the fastener members of said cover when the rear side panels are collapsed, for the purpose specified.

3. In a convertible vehicle body, the combination of sides having door openings therein, doors, said sides and doors being chambered to receive side and door panels, the inner walls of said sides and doors terminating below the outer, front and rear side and door panels telescoping in said sides and doors, top rails hinged to the inner walls of the sides and doors to complement the same and adapted to close outwardly against the outer walls or to clamp the panels when in their erected position, clamping means for said rails whereby the panels are independently supported, frame-like top members hinged to the sides to collapse inwardly about the said door openings thereof or to be swung to erected position constituting door frame members for the erected door panels, and a cover of flexible material, all coacting for the purpose specified.

4. In a convertible vehicle body, the combination of sides having door openings therein, doors, said sides and doors being chambered to receive side and door panels, the inner walls of said sides and doors terminating below the outer, front and rear side and door panels telescoping in said sides and doors, top rails hinged to the inner walls of the sides and doors to complement the same and adapted to close outwardly against the outer walls or to clamp the panels when in their erected position, the outer walls being provided with inwardly facing ribs, said panels being grooved to receive said ribs when the panels are erected and said rails being grooved to receive said ribs when the panels are telescoped, clamping means for said rails whereby the panels are independently supported, frame-like top members hinged to the sides to collapse inwardly about the said door openings thereof or to be swung to erected position constituting door frame members for the erected door panels, and a cover of flexible material, all coacting for the purpose specified.

5. In a convertible vehicle body, the combination of sides having opposed door openings therein, doors, said sides and doors being chambered to receive side and door panels, side and door panels telescoping in said sides and doors, top rails adapted to close the chambers or to clamp the panels when in their erected position, top members hinged to the sides to collapse inwardly or to be swung to erected position constituting door frame members for the erected door panels, detachable cross top members supporting said top members in erected position, a wind shield, and a cover of flexible material adapted to be drawn over said panels and said top frame members, said side panels and top frame members and wind shield, and said cover being provided with coacting disengageable fastener members whereby the cover may be detachably secured thereto, said body being provided with a housing at the rear into which said cover may be collapsed.

6. In a convertible vehicle body, the combination of sides having door openings therein, doors, said sides and doors being chambered to receive side and door panels, side and door panels telescoping in said sides and doors, top rails adapted to close the chambers or to clamp the panels when in their erected position, top members hinged to the sides to collapse inwardly or to be swung to erected position constituting door frame members for the erected door panels, and a cover of flexible material adapted to be drawn over said panels and said top frame members, said side panels and top frame members, and said cover being provided with coacting disengageable fastener members whereby the cover may be detachably secured thereto, said body being provided with a housing at the rear into which said cover may be collapsed.

7. In a convertible vehicle body, the combination of sides having door openings therein, doors, said sides and doors being chambered to receive side and door panels, side and door panels telescoping in said sides and doors, top rails adapted to close the chambers or to clamp the panels when in their erected position, top members comprising uprights and a connecting cross member hinged to the sides to collapse inwardly or to be swung to erected position constituting door frame members for the erected door panels, and a cover of flexible material.

8. In a convertible vehicle body, the combination of sides having door openings therein, doors, sides and doors being chambered to receive side and door panels, side and door panels telescoping in said sides and doors, top rails adapted to close the chambers or to clamp the panels when in their erected position, the outer walls being provided with inwardly facing ribs, said panels being grooved to receive said ribs when the panels are erected and said rails being grooved to receive said ribs when the panels are collapsed, top members hinged to the sides to collapse inwardly or to be swung to erected position constituting door frame members for the erected door panels, and a cover of flexible material.

9. In a convertible vehicle body, the combination of sides and doors therefor, said sides and doors being chambered to receive side and door panels, the panels being independently erected and supported, collapsible top members constituting door frame members for the erected door panels, and a cover of flexible material adapted to be drawn over the top frame members and panels, said top frame members and panels and the flexible cover being provided with coacting disengageable fastening members whereby the cover may be detachably secured thereto with the panels erected, thereby providing a sedan type of body, or with the rear panels collapsed, thereby providing a coupé type of body, or the cover may be attached to the rear portion of the body with all of the panels collapsed, for the purpose specified.

10. In a convertible vehicle body, the combination of sides having opposed door openings therein, doors, said sides and doors being chambered to receive side and door panels, side and door panels telescoping in said sides and doors, means for supporting said panels in erected position, top members comprising a rigidly connected side and top cross piece, hinged to the sides of the body to collapse inwardly as a unit constituting when collapsed a frame about the door openings thereof or to be swung to erected position constituting door frame members for the erected door panels, and a cover, for the purpose specified.

11. In a convertible vehicle body, the combination of sides at least one of which has a door opening therein, a door, said sides and door being chambered to receive side and door panels, side and door panels telescoping in said sides and door, a frame-like top member comprising a rigidly connected side and top member hinged to the sides of the vehicle body to swing inwardly as a unit constituting a frame about the door opening and to be swung to erected position constituting a door frame member for the erected door panel, and a cover of flexible material adapted to be drawn over said panels and door frame member when erected, said body being provided with a housing at the rear into which said cover may be collapsed.

12. In a convertible vehicle body, the combination of sides at least one of which has a door opening therein, a door, said sides and door being chambered to receive side and door panels, side and door panels telescoping in said sides and door, and a frame-like top member comprising a rigidly connected side and top member hinged to the sides of the vehicle body to swing inwardly as a unit constituting a frame about the door opening and to be swung to erected position constituting a door frame member for the erected door panel.

13. A convertible vehicle body comprising a chambered side or door, the inner wall of which terminates below the outer, a panel adapted to telescope within the chamber, a top rail hinged to the inner wall to complement the same and adapted to close outwardly against the outer wall or clamp the panel when in its erected position, the outer wall being provided with an inwardly facing rib, said panel being grooved to receive said rib when the panel is erected, said rail beng grooved to receive said rib when the panel is collapsed, and a clamping means for said rail.

14. A convertible vehicle body comprising a chambered side or door, the inner wall of which terminates below the outer, a panel adapted to telescope within the chamber, a top rail hinged to the inner wall to complement the same and adapted to close outwardly against the outer wall or clamp the panel when in its erected position, and a clamping means for said rail.

15. A convertible vehicle body comprising a chambered side or door, a panel adapted to telescope within the chamber, a top rail mounted on the inner wall and adapted to close the chamber or clamp the panel when in its erected position, the outer wall being provided with an inwardly facing rib, said panel being grooved to receive said rib when the panel is erected, said rail being grooved to receive said rib when the panel is collapsed, and a clamping means for said rail.

16. A convertible vehicle body comprising a chambered side or door, a panel adapted to telescope within the chamber, a top rail mounted on the inner wall and adapted to close the chamber or clamp the panel when in its erected position, and a clamping means for said rail.

In witness whereof, I have hereunto set my hand and seal.

ALBERT OWEN HOLTOM. [L. S.]